United States Patent
Studnicka (10) Patent No.: US 10,783,478 B2
(45) Date of Patent: Sep. 22, 2020

(54) UNMANNED AERIAL VEHICLE DELIVERY SYSTEM

(71) Applicant: PayPal, Inc., San Jose, CA (US)

(72) Inventor: Todd Murray Studnicka, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 835 days.

(21) Appl. No.: 15/084,919

(22) Filed: Mar. 30, 2016

(65) Prior Publication Data

US 2017/0286892 A1 Oct. 5, 2017

(51) Int. Cl.

| | |
|---|---|
| *G06Q 10/08* | (2012.01) |
| *B64C 39/02* | (2006.01) |
| *G06Q 20/20* | (2012.01) |
| *G06Q 20/38* | (2012.01) |
| *G06Q 20/40* | (2012.01) |
| *G06Q 20/32* | (2012.01) |
| *G06Q 20/42* | (2012.01) |
| *G06Q 20/26* | (2012.01) |

(52) U.S. Cl.
CPC ......... *G06Q 10/083* (2013.01); *B64C 39/024* (2013.01); *G06Q 20/204* (2013.01); *G06Q 20/26* (2013.01); *G06Q 20/3224* (2013.01); *G06Q 20/389* (2013.01); *G06Q 20/401* (2013.01); *G06Q 20/4016* (2013.01); *G06Q 20/42* (2013.01)

(58) Field of Classification Search
CPC .. G06Q 10/083; G06Q 20/10; G06Q 20/0453; G06Q 20/0457; G06Q 20/20; G06Q 20/32; G06Q 10/0832; G06Q 10/0833; G06Q 10/08355; G06Q 10/0838; G06Q 50/28; B64C 39/024; G07F 17/42; H04N 1/00148; H04N 5/76; G11B 31/006; G03B 2206/002; G06F 16/27; G06F 16/29; G06F 16/583; G06F 16/5866; G06F 16/61; G05D 1/016; G05D 1/0022; G05D 1/0027; G05D 1/0038; G05D 1/0088; G05D 1/0094; G06K 9/00644; G06K 9/00825; G06K 9/4604; G08G 5/0069
USPC ........................................................ 705/338
See application file for complete search history.

(56) References Cited

U.S. PATENT DOCUMENTS 9,747,901 B1 * 8/2017 Gentry ................... G10L 15/22
10,163,177 B2 * 12/2018 Farris ................... A47G 29/122
(Continued)

OTHER PUBLICATIONS

"Computer Vision Based General Object Following for GPS-denied Multirotor Unmanned Vehicles," Jesus Pestana, Jose Luis Sanchez-Lopez, Srikanth Saripalli, and Pascual Campoy. American Control Conference. (2014)(Hereinafter Vision (Year: 2014).*

*Primary Examiner* — George Chen
*Assistant Examiner* — Brian Adams Heflin
(74) *Attorney, Agent, or Firm* — Haynes and Boone, LLP (57) ABSTRACT

Disclosed are systems, mediums, and methods of an unmanned aerial vehicle (UAV) delivery system. The system controls and manages UAVs for delivering packages. The system receives a drop off location for a package and instructs a UAV to navigate to the drop off location with the package. The system notifies a recipient of the package delivery through a device of the recipient, and in response to receiving one or more responses to the notification, causes the UAV to allow access to the package being delivered.

20 Claims, 3 Drawing Sheets

(56) References Cited

U.S. PATENT DOCUMENTS

| | | | | |
|---|---|---|---|---|
| 2009/0070257 | A1* | 3/2009 | Csoka | G06Q 20/10 |
| | | | | 705/39 |
| 2013/0335541 | A1* | 12/2013 | Hernandez | G06Q 10/083 |
| | | | | 348/61 |
| 2014/0136414 | A1* | 5/2014 | Abhyanker | G06Q 50/28 |
| | | | | 705/44 |
| 2015/0302495 | A1* | 10/2015 | Stuckman | G01S 1/00 |
| | | | | 705/26.35 |
| 2016/0068264 | A1* | 3/2016 | Ganesh | G08G 5/0069 |
| | | | | 701/2 |
| 2016/0189098 | A1* | 6/2016 | Beaurepaire | G06Q 10/0835 |
| | | | | 705/337 |
| 2016/0239803 | A1* | 8/2016 | Borley | G06Q 10/0833 |
| 2016/0350711 | A1* | 12/2016 | Tsao | G06Q 10/0833 |
| 2017/0011333 | A1* | 1/2017 | Greiner | G06Q 10/083 |
| 2017/0011343 | A1* | 1/2017 | Stenneth | B25J 9/163 |
| 2017/0090484 | A1* | 3/2017 | Obaidi | B64C 39/024 |
| 2017/0091707 | A1* | 3/2017 | Akselrod | G06Q 10/0833 |
| 2017/0228690 | A1* | 8/2017 | Kohli | G06Q 10/0832 |
| 2018/0204177 | A1* | 7/2018 | Ferla | G06Q 10/0833 |

* cited by examiner

UNMANNED AERIAL VEHICLE DELIVERY SYSTEM

TECHNICAL FIELD

This disclosure generally relates to unmanned aerial vehicle systems, and more particularly, to unmanned aerial vehicle system used for deliveries.

BACKGROUND

A major problem with online purchases has been determining which party assumes the cost and risk of a lost, stolen, and/or damaged package. Often times it is difficult to determine who is at fault when a package is lost, stolen, and/or damaged. In some cases the recipient may feign a stolen package in an attempt to get something for free. Sometimes a delivery service will damage a package, but accuse the recipient or the merchant for the damages. In some cases, the merchant may intentionally send damaged goods and place blame on the shipping company or the recipient as part of a fraudulent scheme. As a result, the risk of lost, stolen, and/or damaged goods are priced into the shipping and product costs. This in turn may reduce sales margins or make certain sales to be unprofitable. Furthermore, this risk is often times passed onto the consumer through price increases. Another frustrating issue for consumers during online purchases is that the consumer has to pay up front for an item before the item is sent to the consumer. This puts the consumer in a disadvantageous position in a purchase dispute because the money, which could be used as leverage to settle a dispute, has already left the account of the purchaser.

Thus it would beneficial if there was a system and method that monitors a package delivery and gathers evidence of a successful delivery. Furthermore, it would be beneficial if such a system allows cash on delivery rather than requiring the consumer to pay before delivery.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some examples, a system and method for an unmanned aerial vehicle (UAV) package delivery system is provided. In some embodiments, the system controls and manages package deliveries with a UAV device. In some examples, the system may receive a package delivery request with information about the package. The information about the package may include dimensions, weight, type of item(s) in the package, special handling instructions, and/or other properties. Based on these properties, the system may assign the package to a UAV device for conducting the delivery. For example, the system may select a UAV with sufficient capacity to carry the weight of the package. In some examples, the selection of the UAV device may depend on other factors as well. For example, if there are several facilities housing UAV devices, the system may select a UAV device in a facility closest to the delivery location.

In some examples, the system may detect when the package has been loaded onto the UAV device. In some examples the UAV may find and pick up the package for loading. In some examples, the package may be loaded onto the UAV manually. The UAV may scan a package slip or package for information to identify the package and determine whether the package being loaded onto the UAV is meant for the UAV, such as by comparing data sent to or programmed into the UAV from the system, such as a service provider. The system may be in constant, regular, and/or periodic communication with the UAV to receive information for processing and provide instructions to the UAV. For example, the system may identify packages based on scanned images of the package received from the UAV.

The system may also determine a path for a UAV to take for transporting a package to its destination. In some examples, the system may receive global positioning location information for a package delivery destination. The location may be the location of a recipient device, such as a mobile phone, a home address, a business address, or any other dynamic or static location. Based on the location information the system may determine a path for the UAV to take to the delivery destination. In some examples, the path may include one or more charging stations for the UAV to charge at. In some examples, the charging stations may be configured to wireless charge the battery of a UAV when the UAV lands at the charging station. In some examples, the charging station may be in communication with the system to provide charging information, confirmation that the UAV landed at the charging station, and/or other maintenance check information about the UAV, including how much charge to provide based on distance to delivery, weight of package, and weather, such as wind speed and direction and absence or presence and severity of rain.

Furthermore, the system may instruct the UAV to hover near a delivery location as part of a cash-on-delivery purchase model. The UAV and/or system may wait for a payment for the package to be cleared and/or authorization for the package to be delivered. In some examples, the UAV may be equipped with a point of sale device for accepting different forms of payment. The UAV may also implement one or more mechanisms to prevent access to the package until payment is received and/or the package has been accepted by the recipient. In some examples, the UAV may prevent access to the package by hovering at a height out of reach from individuals. In some examples, the UAV may have a lockable compartment for the package that the UAV may unlock to provide access to in response to one or more actions and/or instructions from the system, recipient, and/or merchant.

The system may also instruct or use the UAV to obtain evidence of a successful delivery. For example, the UAV may have one or more imaging or sound capture devices that records the delivery and provides it to the system as evidence of proof of delivery. With a sound capture device, the recipient may be instructed to verbally confirm safe delivery and acceptance of the package. The UAV may also obtain other forms of proof of delivery, such as a signature, biometric reading, pin numbers, account information, and/or the like. After the delivery, the system may instruct the UAV to return to a return location.

In examples, disclosed is a system comprising a non-transitory memory and one or more hardware processors coupled to the non-transitory memory and configured to read the instructions from the non-transitory memory to perform specific operations. In some examples, the operations comprise receiving, from a user device, a purchase order and a location of delivery, such as a dynamic location of the user device; in response to receiving the order, instructing an unmanned aerial system (UAS) to navigate an unmanned aerial vehicle (UAV) to the location; receiving, from the UAS, an indication that the UAV is within a threshold distance of the location; in response to receiving the indication, providing a notification to the device; receiving, from the device, a request to accept a package; in response to receiving the acceptance, transferring funds from a first account to a second account; and instructing the UAV to allow access to the package and obtain evidence that the package was delivered.

Some examples disclose a UAV, comprising a non-transitory memory storing instructions; and one or more hardware processors coupled to the non-transitory memory and configured to read the instructions from the non-transitory memory to cause the UAV to perform specific operations. In some examples the operations may comprise receiving a location of a user device or designated delivery location; navigating to the location; in response to navigating within a threshold distance of the location, sending a notification to the user device; receiving an indication of acceptance for a package carried by the UAV; and in response to receiving the indication, allowing access to the package carried by the UAV and recording evidence that the package was delivered.

In some examples, disclosed is a system, comprising a non-transitory memory storing instructions and a server having one or more hardware processors coupled to the non-transitory memory and configured to read the instructions from the non-transitory memory to cause the system to perform specific operations. In some examples, the operations may include receiving, from a user device, a purchase order and a drop off location; in response to receiving the order, instructing a UAV to move to within a threshold distance of the drop off location; receiving location information from the UAV; in response to the location information being located within the threshold distance of the drop off location, sending a notification to the user device; and in response to receiving, from the user device, a response to the notification from the user device, causing the UAV to release a package carried by the UAV.

Figure 1:
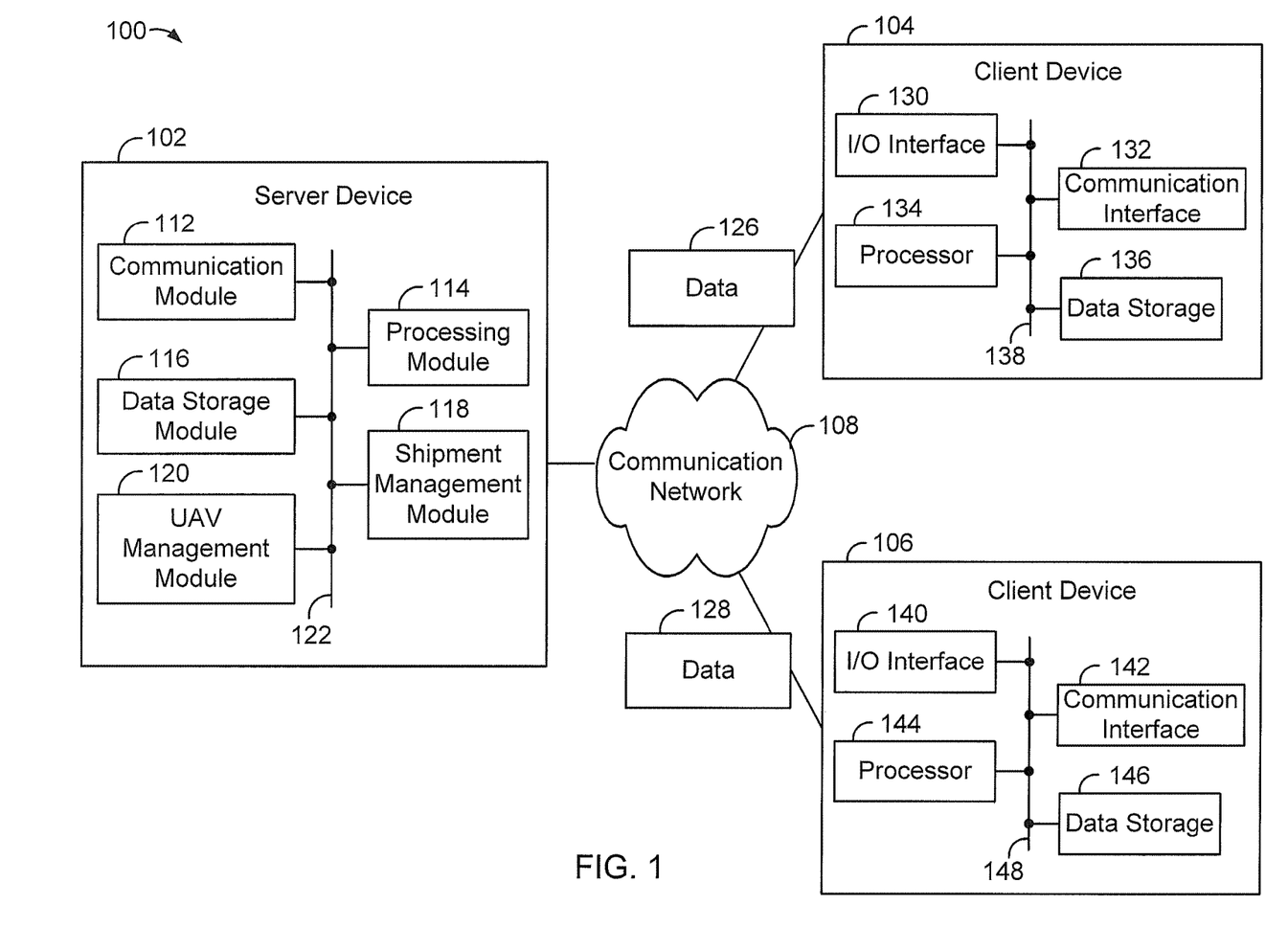
FIG. 1 is a simplified block diagram of an unmanned aerial vehicle delivery system, according to some embodiments.

FIG. 1 is a simplified block diagram of an example UAV delivery system 100, according to some embodiments. In some examples, the UAV delivery system may be implemented partially by a UAS comprising charging stations, UAVs, and other devices. As shown, UAV delivery system 100 includes multiple computing devices, namely a server device 102, a client device 104, also referred to as a first client device 104, and a client device 106, also referred to as a second client device 106. Server device 102 may be configured to manage, parse, and/or construct and deconstruct data packets that include various types of data such as multimedia data. Furthermore, also included in UAV delivery system 100 is a communication network 108. UAV delivery system 100 may operate with more or less than the computing devices shown in FIG. 1, possibly communicating with each device via a communication network 108. Generally, server device 102, client device 104, and client device 106 are configured for communicating with each other via communication network 108.

The communication network 108 may be a data network, a switch network, and/or a packet-switched, and/or another network configured to provide digital networking communications and exchange data of various forms, content, type, and/or structure. Communication network 108 may correspond to small scale communication networks, such as a private or local area network and/or a larger scale network, such as a wide area network or the Internet, possibly accessible by the various components of system 100. Communication network may include network adapters, switches, routers, network nodes, and various buffers and queues to exchange data packets and various forms of data. For example, communication network 108 may be configured to carry data packets such as data and/or data packet 126 and data and/or data packet 128. Communication network 108 may exchange such data between server device 102, client device 104, and client device 106 using various protocols such as Transmission Control Protocol/Internet Protocol (TCP/IP), among other possibilities.

UAV delivery system 100 may also include other computing devices or implement software components that operate to perform various methodologies in accordance with the described embodiments. For example, UAV delivery system 100 may include other client devices, stand-alone and/or enterprise-class servers possibly implementing MICROSOFT®, UNIX®, LINUX®, and other client- and server-based operating systems, among other types of operating systems. It may be appreciated that the client devices and server devices illustrated in FIG. 1 may be deployed in other ways. The operations performed and the services provided by such client devices and server devices may be combined or separated for a given embodiment. Furthermore, such operations and servers may be performed by a greater number or a fewer number of devices and/or server devices. One or more devices and servers devices may be operated and maintained by the same or different entities.

In some examples, server device 102 may be configured to perform a variety of functions, such as those described in this disclosure and illustrated by the accompanying figures. For example, server device 102 may be configured to access and/or receive data packets that include information about a package delivery, shipment information, account information, and/or the like. Furthermore, server device 102 may access and/or receive the data packets from network nodes, network adapters, switches, routers, and/or various buffers and queues of communication network 108. Yet further, server device 102 may receive the data packets from client devices 104 and 106. In some instances, server device 102 may store the data packets in the data storage module 116. Furthermore, server device 102 may access account information and/or logged shipment information from data storage module 116 to perform certain functions described herein.

Server device 102 may take a variety of forms and may include various components, including for example, a communication module 112, a processing module 114, a data storage module 116, a shipment management module 118, and a UAV management module 120, any of which may be communicatively linked to the other modules via a system bus, network, or other connection mechanism 122.

The communication module/component 112 may take a variety of forms and may be configured to allow server device 102 to communicate with one or more devices according to various protocols. For instance, communication module 112 may be configured to allow server device 102 to communicate with client devices 104 and/or 106 via communication network 108. In one example, communication module 112 may take the form of a wired interface, such as an Ethernet interface. As another example, communication module 112 may take the form of a wireless interface, such as a cellular interface, a WI-FI interface, a short-range interface, a point-to-multipoint voice interface, and/or a data transfer communication interface. For instance, communication module may take the form of a short-range radio frequency interface for mobile devices and Local Areas Network (LAN) access points for digital transmission over the 2.4 GHz bandwidth such as Bluetooth®.

In some instances, communication module/component 112 may receive, access, and/or send data packets that include data indicative of a package shipment and/or information about a shipment. For example, communication module 112 may access the data packets from network nodes, network adapters, switches, routers, and/or various buffers and queues of communication network 108. Yet further, server device 102 may transmit, receive, and/or access the data packets from the client devices, among other possibilities to exchange the data packets.

Processing module/component 114 may include or take the form of a general purpose processor (e.g., a microprocessor). Furthermore, processing module/component 114 may include or take the form of a processing component and/or a special purpose processor such as a graphics processing unit (GPU) optimized for graphics rendering and/or image processing. As such, processing module/component 114 may access data and/or data packet 126 from client device 104. Furthermore, processing module/component 114 may access data and/or data packet 128 from client device 106. For example, data packet 126 and data packet 128 may travel over communication network 108. Furthermore, data packets 126 and 128 may include an addresses associated with client device 104 and 106, such as an IP address, MAC address, and/or the like, respectively. Yet further, data packets 126 and 128 may also include protocol data such as Transmission Control Protocol/Internet Protocol (TCP/IP). In various embodiments, each of data packets 126 and 128 may include 1,000 to 1,500 bytes, among other possible ranges.

The data storage module/component 116 may include one or more volatile, non-volatile, removable, and/or non-removable storage components, such as magnetic, optical, or flash storage, and may be integrated in whole or in part with processing module/component 114. Furthermore, data storage module 116 may include or take the form of a non-transitory computer-readable storage medium, having stored thereon machine-readable instructions, e.g., compiled or non-compiled program logic and/or machine code. In some instances, the instructions may be executed by modules/components 112-118, that may take the form of hardware modules/components of server device 102. Furthermore, the instructions may cause the server device 102 to perform operations, such as those described in this disclosure and illustrated by the accompanying figures.

Shipment management module 118 may identify from the received data details and progress of one or more shipments of a package. Furthermore, shipment management module 118 may identify such details from different types of data, such as image data, received from different devices entities, such as a third party device, client device 104 and/or client device 106. Yet further, shipment management module 118 may be configured to implement image recognition, object recognition, and/or pattern recognition, among other types of computer vision technology to identify the details from the image data. In some instances, shipment management module 118 may identify shipment delivery conditions from the image data. For example, shipment management module 118 may identify obstructions for landing a UAV, a large crowd of people, available landing area, and/or other delivery conditions for a location. Furthermore, module 118 may receive other forms of data for storage or analysis to determine the progress of a shipment, such as global positioning system (GPS) data from client devices 104 and 106, weather conditions from a third party server, shipment confirmations, payment authorizations and/or the like.

Furthermore, shipment management module 118 may determine instructions to provide to one or more client devices 104 and 106 in response to information received about a shipment progress. For example, considering the examples described above, shipment management module 118 may identify an obstruction for landing of a UAV. As such, shipment management module 118 may implement instructions for requesting and/or changing delivery locations. In particular, shipment management module 118 may communicate with one or more client devices 104 or 106 to request a new shipment location and/or notify the devices that a shipment location is unfit for delivery. Yet further, shipment management module 118 may update shipment information and/or delivery logs with any changes that occur, such as the delivery location.

In some examples, shipment management module 118 may request a payment authorization from one or more client devices 104 and/or 106. Shipment management module 118 may request account numbers, username and password, and/or other authentication information. Upon receiving such information, shipment management module 118 may attempt to conduct a funds transfer and/or provide authorization for a funds transfer. In some examples, in response to receiving a payment confirmation to a funds transfer, shipment management module 118 may instruct one or more of client devices 104 and/or 106 to release a package for delivery.

In some embodiments, one or more of client devices 104 and/or 106 may be associated with an account, possibly for providing and/or receiving payment for a successful shipment. For example, one of client devices 104 and/or 106 may be registered with a merchant account that sells items or objects for shipment using system 100. As such, the merchant account may be provided payment for a package delivery associated with the merchant account. In some examples, one of client devices 104 and/or 106 may be registered with a recipient account for purchasing items from merchants. As such, payment may be retrieved from the recipient account for a delivered package for payment of a delivery and/or to a merchant.

In some examples one of client devices 104 and/or 106 may be a UAV controlled by sever device 102. The UAV may be used to conduct shipments and provide shipment management module 118 information about the progress of a shipment.

Shipment management module 118 may include one or more general purpose processors, microprocessors, and/or one or more special purpose processors such as a digital signal processor (DSP), a graphics processing unit (GPU), a floating point unit (FPU), a network processor, and/or an application-specific integrated circuit (ASIC). In some instances, special purpose processors may be capable of image processing, image alignment, and/or merging images, among other possibilities. Shipment management module 118 may include components, pre-configured circuits, dedicated circuits, and/or hardware components of server device 102. Furthermore, shipment management module 118 may include circuits and/or hardware components that are configured to carry out one or more operations described in this disclosure and illustrated by the accompanying figures. For example, shipment management module 118 may identify from data packet 126 information related to the progress of a shipment. Yet further, shipment management module 118 may determine from data packet 128 other information related to the progress of a shipment.

UAV management module 120 may determine and manage instructions for one or more client devices 104 and/or 106 that are UAVs for conducting a package delivery. Furthermore, the instructions may also include the details of the one or more packages for delivery and the instructions on where and how the delivery is to be conducted. UAV management module 120 may include one or more general purpose processors, e.g., microprocessors, and/or one or more special purpose processors, e.g., DSPs, GPUs, FPUs, network processors, or ASICs. Furthermore, UAV management module 120 may include components, pre-configured circuits, dedicated circuits, and/or hardware components of server device 102. In addition, UAV management module 120 may include circuits and/or hardware components that are configured to carry out one or more operations described in this disclosure and illustrated by the accompanying figures.

As such, in some embodiments, UAV delivery system 100 may include processing module 114 of server device 102 that accesses data packets 126 from client device 104, which may be a UAV. Data packets 126 may include the status and location of client device 104. Furthermore, UAV management module 120 of server device 102 may identify when client device 104 is near a delivery location. Yet further, UAV management module 120 may further determine instructions for client device 104 for completing a shipment. In addition, shipment management module 118 may communicate with other client devices, such as client device 106, with delivery notifications and/or requests for information. Furthermore, UAV management module 120 of the server device may also log information for and manage multiple UAV client devices with multiple shipments of different items. Yet further, UAV management module 120 may maintain communications with UAV client devices providing updated delivery instructions and receiving delivery progress reports. In some examples, UAV management module 120 may use communication module 112 of server device 102 to send and receive information from the UAV client devices and other client devices represented by client devices 104 and 106.

As with server device 102, client devices 104 and 106 may be configured to perform a variety of operations such as those described in this disclosure. In some examples client devices 104 and 106 may represent multiple devices rather than a single device. Client devices 104 and 106 may be configured to exchange, send, and/or receive data packets from server device 102 such as data packets 126 and 128 including multimedia data, image data, account information, location data, and/or the like.

Client devices 104 and 106 may take a variety of forms, including for example, a personal computer (PC), a smart phone, a laptop/tablet computer, a wearable computing device, a smart watch, and/or a head-mountable display/device, among other types of computing devices capable of transmitting and/or receiving data. Furthermore, client devices 104 and 106 may take the form of an UAV, a drone device, a robotic device, a device capable of taking flight, smart phone, tablet computer, beacon device, smart watch, and/or other types of devices capable of transmitting and/or receiving data. Client devices 104 and 106 may include various components including I/O interfaces 130 and 140, communication interfaces 132 and 142, processors 134 and 144, and data storages 136 and 146, respectively, all of which may be communicatively linked with each other via a system bus, network, or other connection mechanisms 138 and 148, respectively.

I/O interfaces 130 and 140 may be configured for facilitating interaction between client devices 104 and 106 and users of client devices 104 and 106. For example, I/O interfaces 130 and 140 may be configured to capture image data, sound data, and/or audiovisual data, among other possible forms of data. As such, I/O interfaces 130 and 140 may include input components such as a touch screen, camera, a camera configured to capture audiovisual data, a microphone configured to capture sound data, a magnetic strip reader, near field communications (NFC) reader, and/or other input devices. Furthermore, I/O interfaces 130 and 140 may include computer mouse, a keyboard, and/or a touch sensitive panel. In addition, I/O interfaces 130 and 140 may include output components such as display screens, speaker, and/or the like which, for example, may be combined with a touch sensitive panel and a haptic feedback system.

Communication interfaces 132 and 142 may take a variety of forms and may be configured to allow client devices 104 and 106 to communicate with one or more devices according to any number of protocols. For instance, communication interfaces 132 and 142 may be configured to allow client devices 104 and 106, respectively, to communicate with server device 102 via communication network 108. As noted, communication module 112 may take the form of a wired or wireless interface to facilitate the communication with client devices 104 and 106.

Processors 134 and 144 may include general purpose processors and/or special purpose processors. Data storages 136 and 146 may include one or more volatile, non-volatile, removable, and/or non-removable storage components, and may be integrated in whole or in part with processors 134 and 144, respectively. Furthermore, data storages 136 and 146 may take the form of non-transitory computer-readable storage mediums, having stored thereon machine-readable instructions that, when executed by processors 134 and 144, cause client devices 104 and 106 to perform operations, respectively, such as those described in this disclosure and illustrated by the accompanying figures. Such machine-readable instructions may define or be part of a discrete software application, such a native app or web app that can be executed upon user request for instance.

Figure 2:
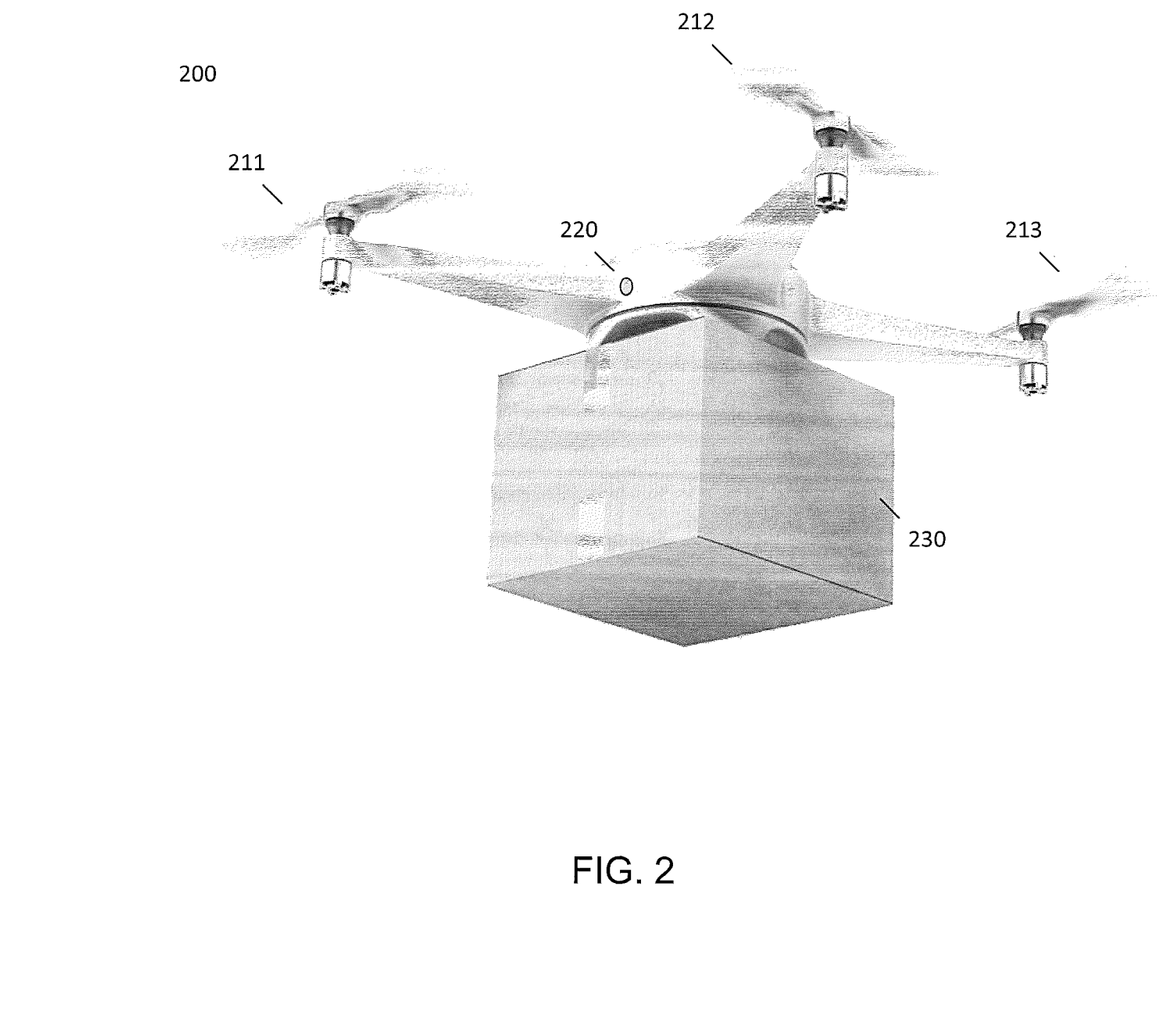
FIG. 2 is an exemplary unmanned aerial vehicle that may be implemented in the system of FIG. 1, according to some embodiments.

FIG. 2 illustrates an exemplary UAV 200 that may be used as part of UAV based delivery system or a UAS, such as UAV based delivery system 100 of FIG. 1. In some examples UAV 200 may be client device 104 or 106 of FIG. 1. Furthermore, UAV 200 may have one or more propellers 211, 212, and 213. In other embodiments, UAV 200 may have more or less propellers. Note that the UAV can have other means for movement, such as wheels, for example. The UAV does not need to be limited to aerial movement only, but can be configured to also move on land or on or under water. UAV 200 may be equipped with one or more image sensors, such as image sensor 220 for capturing images and or videos. In some examples UAV 200 may have several cameras placed strategically such that images from the several cameras may be able to combine or stitch multiple images together to create a panoramic or 360 degree photo sphere image and/or video.

UAV 200 may have means for carrying a package, such as package 230. In some examples, UAV 200 may carry package 230 through a vacuum, magnetic or electro-magnetic, or suction cup fastening mechanism. In some embodiments, UAV 200 may implement a mechanical claw for carrying package 230. In some examples, UAV 200 may include a basket, box, lockable box, container, and/or other cavity based carrying mechanism for carrying package 230.

In some embodiment UAV 200 may have one or more input/output devices (not shown) such as a display, touch screen display, point of sales system, card reader, NFC reader, and/or the like. UAV 200 may be capable of displaying package delivery information on the display and provide instructions to the recipient for retrieving package delivery confirmation and/or payment for a delivery. In some examples, UAV 200 may have a touch screen display which may enable a recipient to provide a signature for a package. In this manner, UAV 200 may record evidence or data that the recipient received a package. In some examples, UAV 200 may include a biometric reader, such as a fingerprint reader, which may be used to ensure that the correct recipient is receiving a package and/or authorizing a payment.

Figure 3:
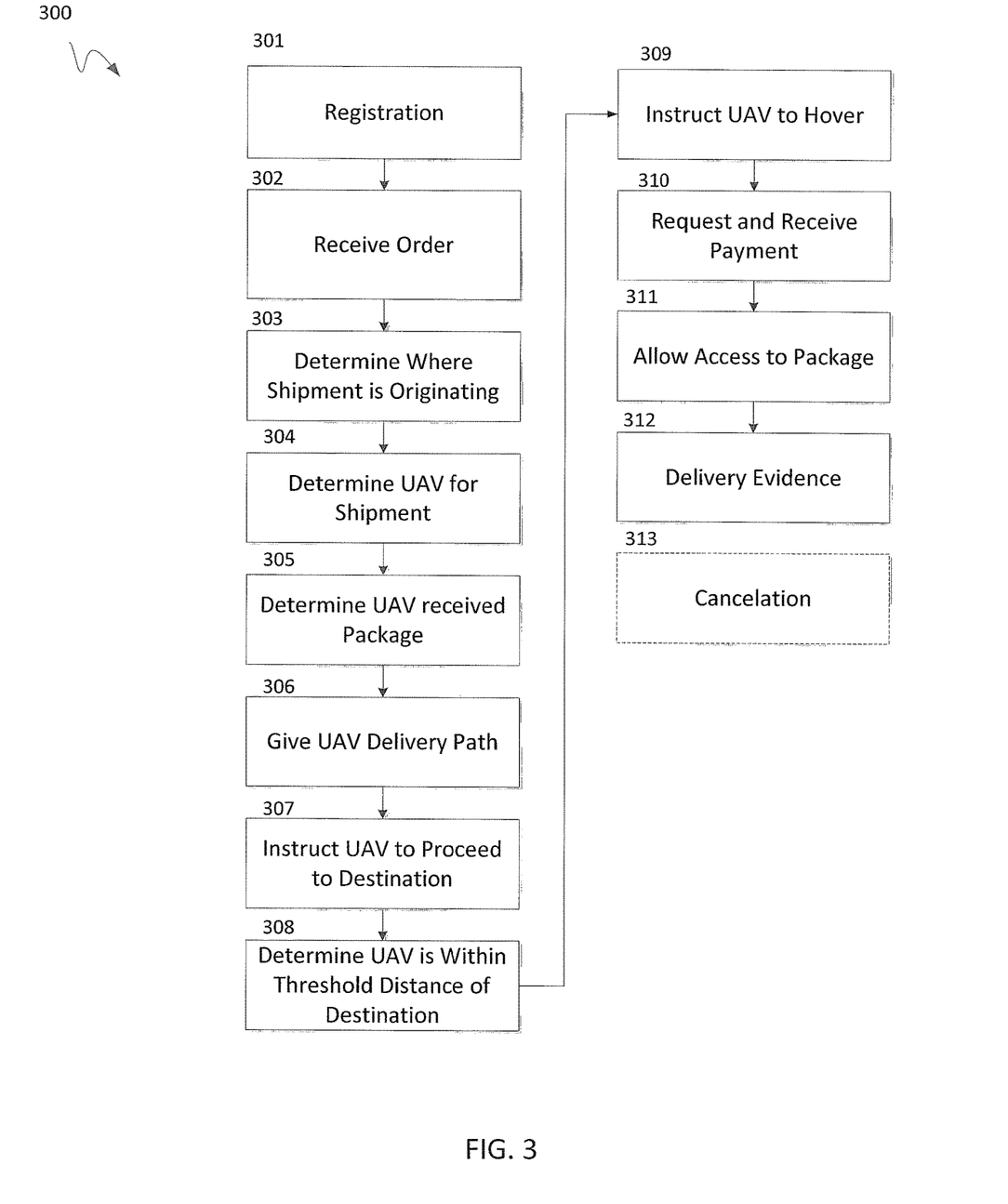
FIG. 3 is a flow diagram illustrating an exemplary process for an unmanned aerial vehicle delivery system, according to some embodiments.

FIG. 3 illustrates an exemplary process 300 that may be implemented by a UAV based delivery system. Process 300 may be implemented on a system such as UAV delivery system 100 of FIG. 1, according to some embodiments. According to some embodiments, process 300 may include one or more of operations 301-304, which may be implemented, at least in part, in the form of executable code stored on a non-transitory, tangible, machine readable media that, when run on one or more processors, may cause a system to perform one or more of the operations 301-313.

In some examples, process 300 may have a registration operation 301. In some examples a system conducting process 300 may receive registration information from a user device, such as client device 104 and/or 106 of FIG. 1, to create a user account and store it in a database. The registration information may include information for identifying and/or authenticating a user, such as a user name, password, biometric identifier, and/or the like. In some examples, registration information may also include information such as addresses, phone numbers, and/or other contact information. Registration information may also include payment information, such as a credit card number, bank account number, payment account information for an online payment system, authentication information for supported online payment systems, and/or the like. In some examples, the system, during registration operation 301, may request and receive additional information about conducting package deliveries. For example, a user may have set up a drop off location for a UAV to drop off packages. The drop off location may include a wireless communications beacon for a UAV to communicate with or pair with to determine where a package the UAV is carrying should be dropped off. In some examples, the beacon may communicate with a short ranged wireless communication protocol such as Bluetooth® low energy (BLE®).

In some examples, the user may provide to the system identifying and/or pairing information associated with the beacon, such as a code, password, serial number, and/or the like. In this manner, the system may be able to instruct a UAV to search, discover, and/or detect the beacon during a package drop off.

In some examples, beacons may be used for high precision package deliveries. For example, the user may be registering for an arena, such as a sporting arena. Each seat within the arena may be a package delivery point with a beacon broadcasting information. In some examples, the information broadcasted by the beacon may be a unique signature in comparison to other beacons within the arena. The user may be able to select a particular seat or area for package delivery. In response to a delivery location being one of the seats or a specific area of the arena, the system may instruct a UVA to use the beacon to identify the seat or area and guide the UAV to the correct delivery location.

In some examples, a system implementing process 300 may receive an order or a package delivery request at operation 302. In some examples, the system may double as a marketplace for purchasing or selling goods and receive a purchase and subsequent package delivery request directly from a user device. In some examples, the system may receive the package delivery request from a merchant and/or third party system.

The package delivery request may include a delivery location or information for the system to determine a delivery location. For example, the system may receive a GPS location of a device as a delivery location. In some examples, the system may receive device and/or account information and may use device and/or account information to determine a default delivery location associated with the account, such as the information provided during operation 301. In some examples the account information may be a username, which may be accompanied by account login credentials. In some examples, as when a user device GPS location is used as a delivery location, the system may request authentication information associated with a registered account from the user device as a fraud prevention measure.

In some examples, the system may receive a beacon identifier as a delivery location. The system may look up or otherwise access the location of the beacon from a database storing the beacon location information, which may have been received during operation 301. In some examples, the beacon may be connected to a network in communication with the system, such as the internet, and the system may retrieve the location directly from the beacon. The system may identify a communication address, such as an IP address, stored in the database for the beacon and use the communication address to request location information from the beacon.

In some examples, the system may also receive other information associated with the package being delivered. For example, the system may receive information such as whether the package is fragile, the weight of the package, the size of the package, the type of content(s) in the package, and/or the like. In this manner, the system may be able to select an appropriate UAV for delivering the package and/or instruct the UAV to handle the package in a certain manner. For example, for heavier and/or larger packages, the system may select a larger UAV for delivering the package and/or the system may specify the number of packages the UAV is going to carry, such as a single package rather than multiple packages. For lighter and/or smaller packages, the system may use this information to select a UAV that can accept additional packages, a smaller UAV, and/or indicate that the UAV may deliver more than one package.

At operation 303, the system may determine the location from which the shipment will originate. In some examples, the operator of the system may have warehouses containing products for shipments in multiple locations. The system may comprise or communicate with an inventory database for products within each of the warehouses. In some examples, the system may determine, such as through a database search, which warehouses have inventory of the item the user ordered or the system has been tasked with shipping at operation 302. The system, may determine which warehouses have the item, which warehouses are closest to the destination location, and select one of the closest warehouses for conducting the shipment. Determining the shipping warehouse may depend on a number of other factors as well, such as inventory size, location, UAV availability at the warehouse, time of day, weather, and/or the like. Note that the originating location may be a residence, office, or other location associated with seller who is an individual.

In some examples, the system may determine the originating location based on the merchant that the order is associated with. For example, a merchant may provide information to the system regarding which location or locations that products ordered from the merchant are to be shipped from. In some examples, the merchant may manually provide, to the system through a merchant device, information about the package for shipping and the location from which the package will ship for each order.

At operation 304, the system may determine which UAV will carry the package for shipment. In some examples, the UAV may be selected based, at least in part, on the shipping location determined at operation 303, information about the package received at operation 302 and/or 303, and/or other information. Other information may include, but is not limited destinations of other UAVs, packages carried by other UAVs, and/or the like.

In some examples, the system may employ a plurality of UAVs of different compartment sizes and/or weight carrying capacity. The UAVs may be configured to carry multiple packages up to its carry capacity or to a predetermined capacity limit. The system may assign packages to drones until the drones leave the facility for a delivery and/or reach a capacity limit. The system may maintain a log for each UAV with what packages have been assigned to the drones along with how much of the capacity is available for the UAV. From the log, the system may determine a UAV that has capacity to carry the package of the order in operation 302 and assign the UAV with the package. Determination of an appropriate UAV may also depend on the estimated time requested/needed for delivery and/or the estimated power consumption needed for delivery, including absence or presence of charging stations along the delivery route.

At operation 305, the system may determine when a UAV receives a package to be delivered. In some examples, a user, employee, or other individual may load the package onto a UAV. As part of the loading process, the UAV may scan a package slip for a received package and relay the scanned package information to a server of the system. In some examples, the scanned package information may include an identifier for the package. In some examples, the package information may be entered into the UAV by an individual. For example, the UAV may include a touch screen display that an individual may use to input information, such as a package identifier, into the UAV. The UAV may relay the package information to the server of system along with information that identifies the UAV. In this manner, the system may determine and track which UAV has received the package and confirm that the UAV is ready to deliver the package.

In some examples, if the UAV providing the package information is not assigned to a package associated with the package information, the server of the system may instruct the UAV to provide a warning. The UAV may include a screen which may display a warning indicating that the UAV is not assigned to that package. In some examples, the UAV may provide the warning in other ways, such as playing a certain sound, outputting a verbal warning, or flashing a light.

In some examples, instead of the system determining which UAV is assigned to each package, an individual may manually assign a UAV to a package. For example, an individual may bring the package to a UAV, have the UAV scan the package, and load the UAV with the package. In some examples, the system may determine whether the package received by the UAV causes the UAV to exceed its carrying capacity. The system may display warnings or other information, such as how much the package is over capacity. If the package is assigned to that particular UAV and does not exceed its capacity, the system may update a log that the UAV has received the package.

At operation 306, a server of the system may determine and provide, to the UAV, a route path for delivering the package carried by the UAV. In some examples, when the UAV is dropping off multiple packages, the server may provide the ordering in which the packages are delivered based on which delivery location is closest to the location of the UAV. In some examples, as the delivery location changes, which may be the case when the delivery location is the GPS location of a user device, the route path and/or delivery order may be periodically updated. The route path may also be updated based on changing conditions, such as weather patterns.

In some examples, the route path for the UAV may include one or more pit stops for charging if the system determines that the route is beyond the battery power of the UAV. In some examples, the system may store a map of charging stations. The system may instruct the UAV to travel or navigate to a delivery location using a path based on nearby charging stations. In some examples, the UAV delivery route may not be the shortest distance between the UAV and the delivery location if charging stations are unavailable along the shortest distance.

In some examples, the system may maintain specifications for the UAV to determine the maximum travel distance of the UAV based on its carrying load. The system may use the maximum travel distance to determine and ensure that a travel route has charging stations within a threshold travel distance that is a fraction of the determined maximum travel distance. In some examples, the system may receive battery information from the UAV regularly, and the system may update the travel distance for the UAV based on the battery information received. The battery information may be information related to the battery life that the UAV monitors. Batteries often degrade in a predictable manner; therefore, the system may conduct a regression analysis of the battery degradation as it is being used by a UAV to predict the maximum distance for the UAV. The system may regularly update the maximum travel distance for the UAV as it changes based on the regression analysis.

In some examples, the system may also determine a delivery path based on weather reports. The system may be configured to receive current and future weather reports from a third party system. In response, the system may update a delivery route for a UAV to avoid areas with poor weather conditions, such as a rainstorm, high head winds, or hurricane. The system may have a predetermined set of weather conditions which are considered poor, and when the system receives an indication that certain areas are experiencing those conditions, the system may change the route of the UAV to bypass those certain areas.

In some examples, the system may also delay the package delivery based on weather conditions and/or information about the package (e.g., how urgent the delivery is, how perishable the items in the package are, how fragile the items in the package are, etc.). For example, when the system receives a weather report that the area encompassing the delivery location is experiencing poor or certain types of weather conditions, the system may instruct the UAV to wait at a charging station or conduct other deliveries until the weather condition changes.

In some examples, if the weather condition does not change for an extended period of time or over a threshold period of time, the system may instruct the UAV to return the package to its original location or another facility. In some examples, the system may instruct the UAV to deliver the package to another delivery station for delivery through other means, such as a delivery driver or a third-party delivery service such as UPS®, FedEx®, and/or the like.

Additionally, in some examples, the system may provide the UAV autopilot instructions in case the UAV loses communications with the system. For example, the system may instruct the UAV to proceed to the nearest charging station when communication is lost or travel to a predetermined location known to have strong and/or stable wireless communication signals, such as within the range of a known cellular communications tower.

In some examples, the system may also send a notification to the merchant and/or package recipient of any delays, expected delays, changed delivery times, and/or an estimated delivery times.

At operation 307, the system may instruct the UAV to proceed to the destination location based on the instructions provided in operation 306. In some examples, the system may provide this instruction once the system has verified that the UAV is carrying all the packages meant for the UAV. This determination may be based on the information determined and/or received at operation 304 and/or 305.

At operation 308, the system may determine that the UAV is within a threshold distance of a destination. In some examples, the threshold distance may be based on a distance between GPS locations of the UAV and the destination location. In some examples, the UAV may, upon reaching or coming within the threshold distance, provide an indication of the location of the UAV to a server of the system. The UAV may also provide an indication that the UAV is within a threshold distance of a delivery location. The UAV may be configured or instructed by the system to hover at a particular altitude upon reaching the threshold distance from the destination location. The threshold distance may be a planar or X-Y distance to the destination location and/or a height or Z distance to the destination location. For example, a more fragile package may result in a lower Z distance than a less fragile package. Furthermore, threshold distance may be revised or adjusted based on various factors, such as a changing weather condition, individuals and density of individuals near the destination location, and obstacles (such as trees, a building, or water detected by the system or the UAV) directly below that may damage the package or prevent the recipient from retrieving or easily retrieving the package. Thus, even though a threshold distance may be met, the UAV may be instructed to move to a more optimal delivery position, such as by decreasing its altitude or moving away from an obstacle.

In some examples, the UAV may be instructed to hover after it is within communication distance of one or more short range wireless beacons, such as the one or more beacons at a delivery point specified at operation 301 and/or 302. In some examples, the UAV, after coming within a threshold distance of the location of the beacons, may scan for a communication signal or broadcast from the beacons. In this manner, the UAV can conserve energy rather than waste energy scanning for a signal from beacons that are out of range. In some examples, the UAV and/or system may instruct the beacons through a network, such as the internet, to begin broadcasting communications over a short ranged wireless network once the UAV is within the threshold distance. In this manner, the beacons can also conserve energy.

In some examples, the beacons may provide identification information to the UAV. In this manner, the UAV or system can determine whether the beacon is the correct beacon for a particular delivery. In some examples, the beacons may communicate a code which the UAV or system may use to verify that the specific beacon is associated with the correct delivery location. This would help prevent nefarious individuals from tricking a UAV into dropping off a package somewhere other than the designated delivery location.

Additionally, the UAV and/or the system may communicate with a device of the recipient that the package has arrived. In some examples, the communication may be a short message service (SMS) message, an email, and/or the like. In some examples, the communication may be with an application installed on the user device. In some examples, the notification may be through a web application accessed through a webserver, and the system may provide a link to the webserver through SMS, email, and/or the like.

In some examples, the system may host the functionality of the device application and/or web application. A user may be able to communicate with the system through the application to accept a package, decline a package, redirect a package, and/or delay a package delivery.

At operation 309, the system may instruct the UAV to hover at a predetermined altitude, within a predetermined altitude range, and/or above a predetermined distance from the floor. The hovering distance and/or altitude may be set at a height that is unreachable to individuals. In this manner, the package and UAV are safe from someone stealing the UAV and/or package. As an example, the UAV may be configured to hover at or above thirty feet, or another distance, from the floor. The UAV may have several cameras or other altimeter functionality that it may use to determine the distance the UAV hovering from a ground floor. The UAV may determine the hovering distance through images taken from multiple cameras on the UAV and principals of stereoscopic imaging. In this manner, the UAV can maintain a certain distance from the floor even when the floor height changes with respect to altitude. Additionally, when the UAV is delivering a package at a top floor of a building, the UAV may still maintain an unreachable distance from the top floor of the building.

In some examples, the system may instruct the UAV to survey the delivery location and provide information to the server of the system for determining whether the environment at the delivery location is inappropriate for the delivery. For example, the system may request and receive images, sound, and/or video captured by the UAV of the delivery location. The server of the system may then analyze and categorize the delivery location and determine whether any of those categories have been predetermined as an unfavorable delivery location. For example, the system may analyze the delivery location to determine if the delivery area is too crowded with people, in an unsafe area where crimes have been committed in the past, if there are too many obstacles, errors in communicating with a beacon, loss of signal, lack a level landing surface, and/or the like. If the system categorizes the delivery location as unfavorable, the system may send a notification to the merchant and/or recipient indicating that delivery cannot or should not be conducted at the designated delivery location. The system may also request an update or change to the delivery location from the recipient or request the recipient accept delivery in view of the warning, including holding the seller and/or the delivery service harmless for the delivery and accepting the delivery as is. In some examples, the system may provide one or more suggested changed delivery locations to the recipient, through the recipient device, which may be chosen from previous delivery locations and/or predetermined delivery points. In response to receiving a new delivery location from the recipient device, the system may instruct the UAV to navigate to the new delivery location, as well as confirming to the recipient the new delivery location and/or estimated time of delivery.

At operation 310 the system may request, receive, or confirm receipt of payment for the package. In some examples, the system may employ or integrate with a cash-on-delivery product purchasing model. In some examples, the UAV may be equipped with a point-of-sale device capable of receiving payment through NFC, card swipes, and/or cash. The UAV may receive payment information from a user through NFC or a card swipe through the point-of-sales device and process payment or relay the information to the server of the system for the system to process payment. In some examples, the point of sale device on the UAV may request authentication information, such as a biometric signature, pin, written signature, and/or the like. The authentication information may be used to ensure that payment is not made fraudulently. The UAV may send the authentication information to the server and/or database of the system for record keeping and/or other purposes. In some examples, the system may use the payment information and/or authentication information to transfer payment from the recipient to the merchant.

In some examples, the system may implement an escrow based payment system. For example, the system may withdraw payment from an account of the recipient and hold the funds in escrow. The system may release the funds from the escrow to the merchant in response to confirmation that the user accepted the package. In some examples, the payment may be handled by a third party, and the system may receive confirmation of a payment rather than handle the payment transfers.

At operation 311, the system may cause the UAV to allow the recipient to access the package. In some examples, the system may allow access to the package in response to the payment confirmation at operation 310. In some examples, the system may instruct the UAV to hover at a lower height or land such that the recipient may be able to reach the package. In some examples, the system may cause the UAV to unlock a lock box to allow access to a package.

In some examples, the system may cause the UAV to drop the package. The system may determine at what height and whether a package can be dropped based on package information received at operation 302. For example, the system may not allow for the package to be dropped if the package information indicates that the package is fragile.

In some examples, the UAV may drop a package upon manual instructions from the recipient. In this manner, the recipient would bear responsibility of any damage to a package that is dropped. Additionally, the recipient may be able to ensure that they are below the package and ready to catch the package when it is dropped by the UAV. In some examples, the UAV may provide a countdown for when the package is going to be dropped such that the recipient may be prepared to catch the package or have time to cancel the package drop. In some examples, the UAV may have audio speakers to emit sound ways indicating the count down. In some examples, the UAV may have a display for displaying a count down. In some examples, the UAV may communicate with a recipient device to provide a countdown.

In some examples, causing the UAV to allow the recipient access to the package may comprise causing the UAV to leave the package at a designated delivery location. In some examples, the UAV may place the package in a mailbox. In some examples, the UAV may be guided to a delivery location by one or more beacons. The UAV may, through communications from one or more beacons, triangulate the delivery location with high precision. In some examples, the beacons may triangulate the location of the UAV with respect to the delivery location and provide distance information to the UAV such that the UAV can navigate to the delivery location. In some examples, the multiple beacons may triangulate the UAV location through communications pings to the UAV through a short range wireless communication protocol, such as BLE®.

Process 300 may also include operation 312 wherein the system causes the UAV to obtain evidence of a successful delivery. In some examples, the evidence may be recipient entry of a signature, PIN, biometric signature, and/or other authentication information received as part of a payment authentication, as discussed in operation 310.

In some examples, the UAV may be equipped with cameras for taking photos of the recipient. The camera may capture one or more photos of the recipient and/or record video evidence of a package delivery (e.g., when the package is released from the UAV) or receipt (e.g., when the recipient actually picks up the package). The photos or video may start shortly before release of the package, during release, or any other suitable time. The evidence may be sent to the server of the system for storage and/or reproduction in case a dispute over the delivery. In some examples, the delivery evidence may be sent to the recipient and/or merchant as part of a delivery confirmation. In some examples, the UAV may analyze photo captures for faces using facial recognition, such that the UAV can ensure that the face of the recipient was captured. In some examples, the UAV may send the evidence to the server of the system, and the system may cause the server to apply facial recognition to the images. In this manner, the computing resources of the UAV are not diverted from other tasks. In some examples, the UAV may be configured with multiple cameras such that it has the capability of taking 360 degree photo sphere images or video. In this manner, the system does not have to implement operations to ensure images of the recipient were captured. Other ways to capture data to confirm delivery and/or receipt include having the recipient acknowledge the delivery, such as through a request and receipt of a verbal response (e.g., "I got it") or a signature or biometric scan on an input device of the UAV or user device. If the recipient is not available, but has indicated acceptable delivery at a particular location, such as in front of the recipient's home, a photo or video may be captured by the UAV of the package at the designated location.

Once the UAV has completed all of its deliveries, the system may instruct the UAV to return to its original facility or another facility. Similar to when the system instructed the UAV to conduct the delivery, the system may provide the UAV directions and/or a path for its return destination.

In some examples, process 300 may have a cancelation operation 313. Cancelation operation 313, when triggered, may interrupt one or more of the operations 301-312. In some examples, the merchant seller, package recipient, and/or system administrator may be provided the capability of canceling a package delivery.

For example, the recipient may be able to communicate to the system a request to cancel a package delivery through an application. The application may be a web application hosted by a web server of the system and/or a native application on a recipient device that communicates with the system through an application program interface. Communication to the system may be over one or more networks such as communication network 108 of FIG. 1.

In some examples, the system may implement different operations for a cancelation request depending which operations have been completed in process 300.

For example, a cancelation during operations 302-304 may simply comprise deleting, from different databases, the existence of an order. In some examples, the system may remove, from a UAV assigned to the canceled package at operation 304, instructions to carry a particular package and/or the package information. The system may update the log for that particular UAV, updating the current carry capacity of the UAV and/or what packages are assigned to the UAV.

If operation 305 has been completed and the UAV is in possession of the package, the system may conduct steps for removing that package from the UAV. For example, the system may contact a system administrator to remove the package or cause the UAV to display a signal that a package needs to be removed. The signal may remain until the package for the canceled order is removed. In some examples, the system may instruct the UAV to drop or remove the package, such as causing the UAV to release a fastening mechanism holding the package for the canceled order. In some examples, the system may instruct the UAV to deliver the package to a certain area of the facility designated for canceled deliveries.

If the UAV is in the middle of delivering the package, such as during one or more operations 307-311, the system may instruct the UAV to keep the package and return the package after any other deliveries that the UAV has tasked with are completed. In some examples, the system may have the UAV drop the package off at a nearby warehouse associated with the system. In some examples, the system may instruct the UAV to return the package to where the UAV initially received the package. In some examples, the UAV may be instructed to deliver the package to a certain area of a facility designated for canceled packages. In this manner, the packages may be restocked and inventories may be updated.

In some examples, if the package has already been delivered, the system may instruct the UAV to pick up the delivered item from the recipient for return. The UAV may implement one or more fraud preventative measures to ensure that the package is the same, such as checking the weight using a weight sensor, and taking images of the package as the recipient returns the package to the UAV.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, other non-aerial unmanned vehicles may also be suitable using various aspects described herein, such as driverless cars or driverless water crafts.

What is claimed is:

1. A system, comprising:
   an unmanned aerial vehicle (UAV) comprising an unmanned aerial system (UAS) configured to control a flight operation of the UAV along a delivery route and at least one camera able to record an evidentiary image at each delivery site along the delivery route;
   a non-transitory memory; and
   one or more hardware processors coupled to the non-transitory memory and configured to read instructions from the non-transitory memory to perform operations comprising:
   receiving, from a user device, a purchase order and a location of the user device;
   selecting the UAV from a plurality of available UAVs to use for a delivery of a package corresponding to the purchase order, wherein the selecting the UAV is based on weight information of the package and the location of the user device;
   in response to the receiving the purchase order and the selecting the UAV, instructing the UAS to navigate the UAV to the location;
   receiving, from the UAS, an indication that the UAV is within a threshold distance of the location;

providing a notification of delivery information to the user device;

receiving, from the user device, a request to accept the package corresponding to the purchase order;

determining a measured weight of the package;

verifying, via communication with the UAS, that the measured weight of the package matches the weight information of the package;

in response to the receiving the request and the verifying, instructing the UAV, via communication with the UAS, to deliver the package and to record, by the camera of the UAV, an image that captures the package and a designated delivery site of the location before instructing the UAS to navigate the UAV to a next location along the delivery route corresponding to a next purchase order;

receiving evidence that the package was delivered by the UAV based on the image; and in response to the receiving the evidence that the package was delivered by the UAV, transferring funds from a first account associated with the user device to a second account based on payment information received using a point-of-sale interface of the UAV.

2. The system of claim 1, wherein the operations further comprise instructing the UAV to change altitude along the delivery route.

3. The system of claim 2, wherein instructing the UAS to navigate the UAV to the location comprises communicating a route leg of the delivery route, wherein the route leg corresponds to the location.

4. The system of claim 3, wherein the route leg corresponding to the location depends at least in part on weather conditions between an originating location of the package and the location of the user device or a location of at least one of a plurality of charging stations.

5. The system of claim 4, wherein the operations further comprise updating the route leg based on a change in the weather conditions.

6. The system of claim 1, wherein the instructing the UAV to deliver the package comprises instructing the UAV, via communication with the UAS, to land at a user designated location.

7. An unmanned delivery vehicle, comprising:
a camera device able to record an evidentiary image at one or more delivery sites along a delivery route;
an unmanned aerial system (UAS) configured to control a flight operation of the unmanned delivery vehicle along the delivery route, wherein the UAS comprises:
a non-transitory memory storing instructions; and
one or more hardware processors coupled to the non-transitory memory and configured to read the instructions from the non-transitory memory to cause the unmanned delivery vehicle to perform operations comprising:
receiving delivery instructions for delivering a package, wherein the delivery instructions comprise a delivery location and a threshold distance from the unmanned delivery vehicle to the delivery location;
navigating to the delivery location;
measuring a weight of the package;
determining that the measured weight of the package matches a specified weight of the package;
in response to determining that the measured weight of the package matches the specified weight of the package, sending a notification to a user device associated with a recipient of the package;
receiving a payment, using a point-of-sale interface of the unmanned delivery vehicle, for the package carried by the unmanned delivery vehicle;
in response to receiving the payment and reaching the threshold distance, allowing access to the package; and
prior to navigating the unmanned delivery vehicle to a next location corresponding to a next purchase order along the delivery route, capturing an image using the camera device connected to the unmanned delivery vehicle, wherein the image includes the package and a designated delivery site where the package was delivered.

8. The unmanned delivery vehicle of claim 7, wherein the operations further comprise receiving and recording a verbal confirmation.

9. The unmanned delivery vehicle of claim 7, wherein the operations further comprise capturing at least one image of the recipient using the camera device connected to the unmanned delivery vehicle.

10. The unmanned delivery vehicle of claim 7, wherein the delivery location is a location of a device of the recipient.

11. The unmanned delivery vehicle of claim 7, wherein the operations further comprise:
determining a condition of the designated delivery site; and
determining a new designated delivery site based at least in part on the condition.

12. The unmanned delivery vehicle of claim 11, wherein determining the new designated delivery site comprises receiving the new designated delivery site from the user device.

13. The unmanned delivery vehicle of claim 11, wherein the operations further comprise determining a previous designated delivery site associated with the user device, and wherein determining the new designated delivery site is further based in part on the previous delivery site.

14. The unmanned delivery vehicle of claim 7, wherein the operations further comprise communicating the captured image to a remote server.

15. A system, comprising:
an unmanned delivery vehicle comprising:
an unmanned aerial system (UAS) communicatively coupled to a server and configured to control a flight operation of the unmanned delivery vehicle along a delivery route;
a weight sensor configured to measure package weights; and
at least one camera able to record one or more evidentiary images at each delivery site along the delivery route;
a non-transitory memory storing instructions; and
the server having one or more hardware processors coupled to the non-transitory memory and configured to read the instructions from the non-transitory memory to cause the system to perform operations comprising:
receiving, from a user device, a purchase order comprising a delivery location associated with the delivery route;
in response to receiving the purchase order, instructing the UAS of the unmanned delivery vehicle, via wireless communication with the UAS, to aerially navigate the unmanned delivery vehicle to within a threshold distance of the delivery location;
determining that location information received from the UAS of the unmanned delivery vehicle indicates that the unmanned delivery vehicle is within the threshold distance of the delivery location;

receiving, via the wireless communication with the UAS, a weight measurement of a package associated with the purchase order from the weight sensor of the unmanned delivery vehicle;

in response to determining that the weight measurement of the package matches a stated package weight, instructing the unmanned delivery vehicle, via the wireless communication with the UAS, to deliver the package associated with the purchase order; and prior to instructing the UAS, via the wireless communication with the UAS, to navigate the unmanned delivery vehicle to a next location along the delivery route corresponding to a next purchase order, capturing, using the at least one camera of the unmanned delivery vehicle and the wireless communication with the UAS, an evidentiary image that includes the package and a delivery site where the package was delivered at the delivery location.

16. The system of claim 15, wherein instructing the unmanned delivery vehicle to deliver the package comprises causing the unmanned delivery vehicle to rest within a threshold distance of a wireless communication device.

17. The system of claim 16, wherein the threshold distance of the wireless communication device is determined through communications with the wireless communication device.

18. The system of claim 15, wherein the operations further comprise sending a notification to the user device confirming the delivery.

19. The system of claim 18, wherein the notification comprises the captured evidentiary image that includes the package and the delivery site where the package was delivered at the delivery location.

20. The system of claim 15, wherein the operations further comprise receiving a verbal confirmation from a recipient indicating a receipt of the package.

* * * * *